(12) United States Patent
Kashihara et al.

(10) Patent No.: US 11,590,508 B2
(45) Date of Patent: Feb. 28, 2023

(54) DESTRUCTION DEVICE

(71) Applicant: SOHO Corporation, Tokyo (JP)

(72) Inventors: Tomio Kashihara, Tokyo (JP); Masaru Harashina, Tokyo (JP); Yoichiro Kashihara, Tokyo (JP)

(73) Assignee: SOHO CORPORATION, Tokyo (JP)

( * ) Notice: Subject to any disclaimer, the term of this patent is extended or adjusted under 35 U.S.C. 154(b) by 316 days.

(21) Appl. No.: 17/036,334

(22) Filed: Sep. 29, 2020

(65) Prior Publication Data
US 2021/0094038 A1    Apr. 1, 2021

(30) Foreign Application Priority Data

Sep. 30, 2019 (JP) .............................. JP2019-179425

(51) Int. Cl.
| | |
|---|---|
| *B02C 25/00* | (2006.01) |
| *B02C 1/00* | (2006.01) |
| *G11B 33/00* | (2006.01) |
| *B02C 19/08* | (2006.01) |
| *B02C 1/04* | (2006.01) |
| *B02C 1/14* | (2006.01) |

(52) U.S. Cl.
CPC ................ *B02C 1/005* (2013.01); *B02C 1/04* (2013.01); *B02C 1/14* (2013.01); *B02C 19/08* (2013.01); *G11B 33/00* (2013.01)

(58) Field of Classification Search
CPC .... B02C 1/04; B02C 1/14; B02C 1/12; B02C 19/08; B02C 25/00
See application file for complete search history.

(56) References Cited

U.S. PATENT DOCUMENTS

| | | | |
|---|---|---|---|
| 7,871,025 B2 * | 1/2011 | Castronovo | B02C 18/0007 241/35 |
| 8,364,306 B2 * | 1/2013 | Rodriguez | G06F 11/006 222/65 |
| 8,794,559 B1 | 8/2014 | Olliges et al. | |
| 9,633,494 B1 * | 4/2017 | Sun | G06K 7/10366 |

(Continued)

FOREIGN PATENT DOCUMENTS

| | | |
|---|---|---|
| EP | 1 712 304 A1 | 10/2006 |
| JP | 2018-010706 | 1/2018 |

OTHER PUBLICATIONS

European Search Report dated Feb. 3, 2021, 5 pages.

*Primary Examiner* — Faye Francis
(74) *Attorney, Agent, or Firm* — Rankin, Hill & Clark LLP

(57) ABSTRACT

A destruction device capable of destroying a plurality of types of storage devices includes: a support plate mounting part to which a support plate is detachably mounted; a crushing member mounting part to which a crushing member is detachably mounted; a support plate detection part capable of detecting the support plate mounted on the support plate mounting part; a crushing member detection part capable of detecting the crushing member mounted on the crushing member mounting part; and a control unit that determines whether the support plate detected by the support plate detection part and the crushing member detected by the crushing member detection part correspond to a same type of storage device, and executes a crushing process for crushing the storage device upon determining that the support plate and the crushing member correspond to the same type of storage device.

10 Claims, 13 Drawing Sheets

(56) References Cited

U.S. PATENT DOCUMENTS

| | | | |
|---|---|---|---|
| 10,675,635 B1 * | 6/2020 | Drexler | ............... B02C 25/00 |
| 11,243,710 B1 * | 2/2022 | Picone | ............... G06F 3/062 |
| 11,400,457 B2 * | 8/2022 | Ebadian | ............ B02C 18/142 |
| 2007/0147776 A1 | 6/2007 | Ito | |
| 2014/0001295 A1 | 1/2014 | Stofan et al. | |

\* cited by examiner

DESTRUCTION DEVICE

CROSS-REFERENCE TO RELATED APPLICATIONS

The present application claims priority to Japanese Patent Application number 2019-179425, filed on Sep. 30, 2019. The contents of this application are incorporated herein by reference in their entirety.

BACKGROUND OF THE INVENTION

The present invention relates to a destruction device capable of destroying a storage device.

Since confidential information is stored in a storage device such as a hard disk, a destruction device that physically crushes a storage device to be disposed of has been used in order to prevent information leakage (see Japanese Unexamined Patent Application Publication Number 2018-10706). The destruction device includes a tray that supports the hard disk, and a crushing tool that crushes the hard disk by sandwiching the hard disk between itself and the tray.

Recently, various storage devices such as a solid state drive (SSD) in addition to hard disks are utilized, and destruction of a plurality of types of storage devices with a single destruction device has been sought. The sizes and shapes of these storage devices are different from each other, and a tray and a crushing tool to be mounted to a destruction device also differ according to the storage devices. For this reason, when a combination of the tray and the crushing tool to be mounted is not appropriate for a storage device to be destroyed, the tray and the crushing tool may be damaged at the time of destroying that storage device.

BRIEF SUMMARY OF THE INVENTION

This invention focuses on this point, and an object of the present invention is to properly destroy a plurality of types of storage devices with a single destruction device.

In one aspect of the present invention, a destruction device capable of destroying a plurality of types of storage devices having different shapes and sizes, the destruction device including: a support plate mounting part to which a support plate that accords with a type of a storage device is detachably mounted; a crushing member mounting part to which a crushing member that (i) accords with the type of the storage device and (ii) sandwiches and crushes the storage device with the support plate is detachably mounted; a support plate detection part capable of detecting the support plate mounted on the support plate mounting part; a crushing member detection part capable of detecting the crushing member mounted on the crushing member mounting part; and a control unit that determines whether the support plate detected by the support plate detection part and the crushing member detected by the crushing member detection part correspond to a same type of storage device, and executes a crushing process for crushing the storage device upon determining that the support plate and the crushing member correspond to the same type of storage device is provided.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

<Configuration of a Destruction Device>

A destruction device 1 according to an embodiment of the present invention for a storage device will be described by referring to FIGS. 1A, 1B, and 2.

Figure 1A:
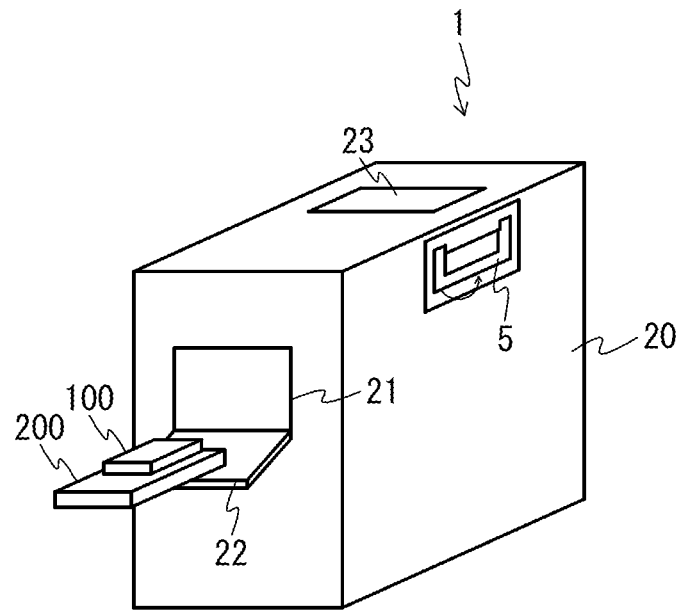
FIGS. 1A and 1B each show an external view of a destruction device 1 according to an embodiment.
Figure 1B:
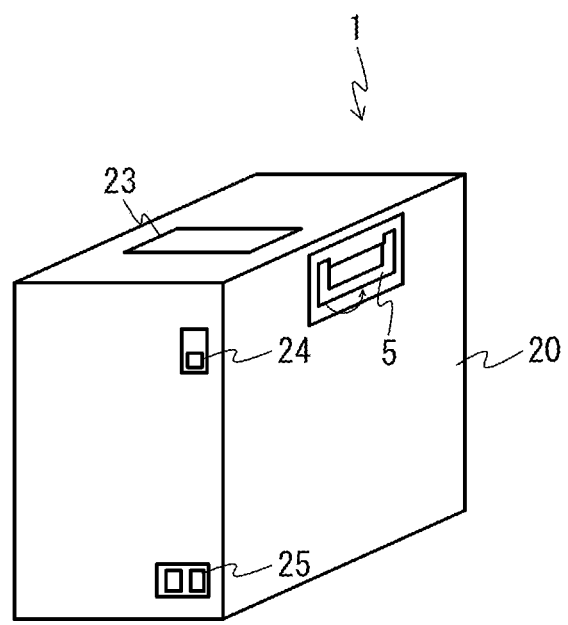
Figure 2:
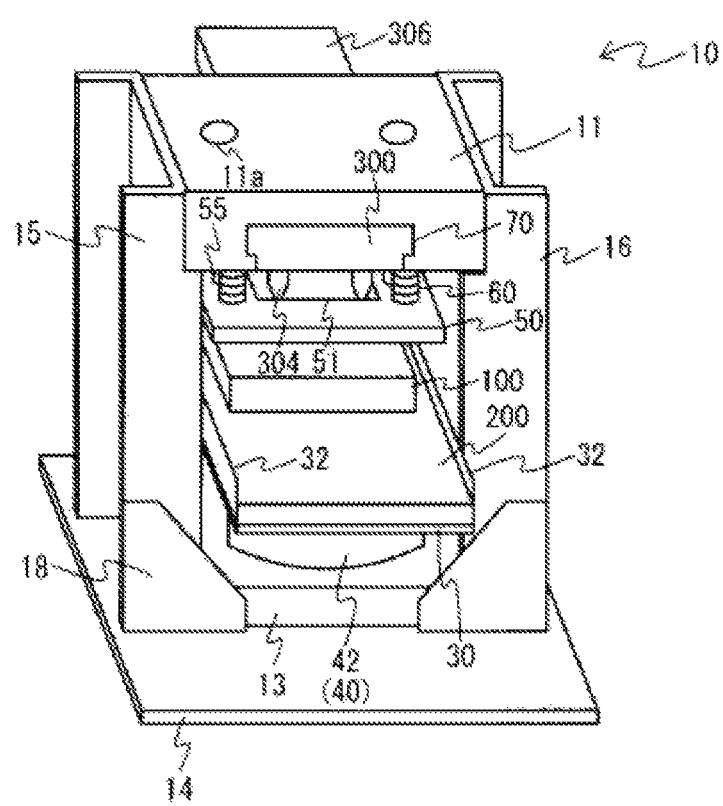
FIG. 2 is a schematic diagram showing a main body part 10.

FIGS. 1A and 1B each show an external view of the destruction device 1 according to an embodiment. FIG. 2 is a schematic diagram showing a main body part 10. It should be noted that FIG. 1A shows the destruction device 1 viewed from the front side, and FIG. 1B shows the destruction device 1 viewed from the back side.

The destruction device 1 is a device that physically destroys the storage device. The destruction device 1 includes, as shown in FIGS. 1A, 1B, and 2, the main body part 10, a cover 20, a table 30, a lifting mechanism 40, a pusher plate 50, compression springs 60, and a tool mounting part 70. The destruction device 1 is a device that crushes a plurality of types of storage devices (here, a storage device 100) having different shapes and sizes, which are placed on the table 30 via the tray 200, with a crushing tool 300 mounted to the tool mounting part 70. The storage device 100 is, for example, a hard disk drive (hereinafter simply referred as a hard disk).

The main body part 10 is a framework section of the destruction device 1 and covered with the cover 20. The main body part 10 has a frame structure, as shown in FIG. 2. The main body part 10 includes a tool block 11, a base block 13, a base plate 14, a left frame 15, a right frame 16, and support plates 18, as shown in FIG. 2.

The tool block 11 is a fixed block in a cuboid shape and located at the top of the main body part 10. The base block 13 is a block in a cuboid shape, similar to the tool block 11, and located at the lower part of the main body part 10. The base block 13 is fixed to the base plate 14. Also, the base block 13 is bolted to the left frame 15, and the tool block 11 is bolted to the right frame 16. The support plates 18 are provided such that they contact the lower part of the left frame 15 and the base block 13, and are members for reinforcing a frame structure of the main body part 10.

The cover 20 covers the main body part 10. The cover 20 includes, as shown in FIGS. 1A and 1B, an insertion opening 21, an opening/closing member 22, an opening/closing member 23, and a power switch 24. The insertion opening 21 is provided on a front surface of the cover 20. The insertion opening 21 is a rectangular opening for attaching and detaching the tray 200, which supports the storage device 100, to and from the table 30.

The opening/closing member 22 is openably provided on the front surface of the cover 20. The opening/closing member 22 rotationally moves between a closed position at which the insertion opening 21 is closed and an open position (the position shown in FIG. 1A) at which the insertion opening 21 is opened. When the opening/closing member 22 is positioned in an open state, the tray 200 supporting the storage device 100 is inserted or taken out from the insertion opening 21. When the opening/closing member 22 is positioned in the closed position, crushing of the storage device 100 is performed.

The opening/closing member 23 is openably provided on an upper surface of the cover 20. When the opening/closing member 23 is positioned in the open state, the crushing tool 300 is inserted or taken out from an upper surface opening (not shown). When the opening/closing member 23 is positioned in the closed position (position where the upper surface opening is closed), the crushing tool 300 crushes the storage device 100. It should be noted that in the present embodiment, the insertion opening 21 corresponds to a first opening. The upper surface opening corresponds to a second opening.

The power switch 24 is provided on a back surface of the destruction device 1. Further, an outlet 25 for a power cord is provided on the back surface of the destruction device 1.

The table 30 is a support plate mounting part to which the tray 200 that supports the storage device 100 is detachably mounted. Specifically, the tray 200, which is a support plate that supports the storage device 100, is detachably mounted on the table 30. The table 30 has a pair of guide plates 32, and an abutting pin 34 (see FIGS. 3A and 3B). One of the guide plates 32 is provided on a left side of the table 30 and the other guide plate 32 is provided on a right side of the table 30, and the pair of the guide plates 32 guide the tray 200 to be mounted. The abutting pin 34 is provided in the central part of the back of the table 30, and performs longitudinal positioning of the storage device 100.

An operator inserts the tray 200, on which the storage device 100 is placed, from the insertion opening 21 and mounts the tray 200 on the table 30. The table 30 is coupled to a hydraulic cylinder 42 of the lifting mechanism 40 and moves up or down between a standby position and a crushing position. When the table 30 is in the standby position, the tray 200 supporting the storage device 100 is mounted.

Figure 3A:
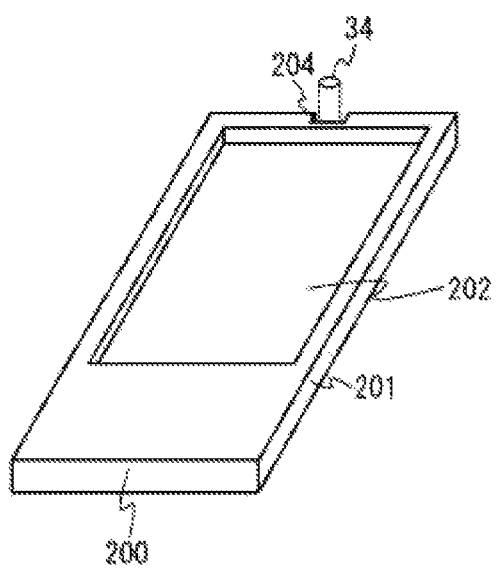
FIGS. 3A and 3B are each a schematic diagram illustrating a configuration of a tray 200.
Figure 3B:
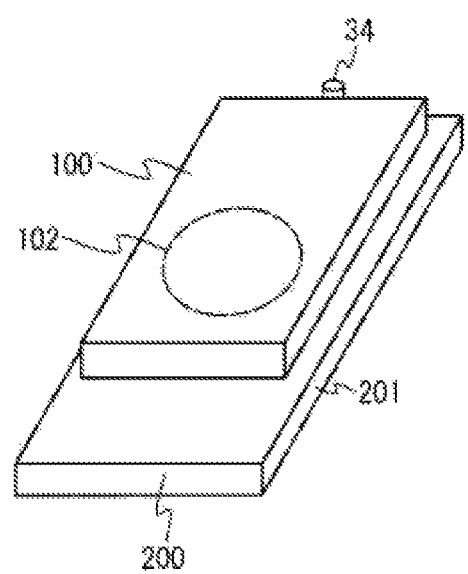

FIGS. 3A and 3B are each a schematic diagram illustrating a configuration of the tray 200. FIG. 3A shows the tray 200, and FIG. 3B shows the tray 200 on which the storage device 100 is placed. The tray 200 is formed in a rectangular flat plate shape. The tray 200 has a support recessed part 202 and a notch 204 for positioning. It should be noted that a side surface 201 of the tray 200 is a part to be detected of the support plate, which is detected by a tray detection part that will be described below.

The support recessed part 202 is formed with a size that is approximately the same as an external form of the storage device 100, and supports the storage device 100. The storage device 100 is fitted into the support recessed part 202 and then set in the tray 200. This prevents a shift of the storage device 100 set in the support recessed part 202 with respect to the tray 200.

Here, the notch 204 for positioning is a part notched in one end side in the longitudinal direction of the tray 200. When the tray 200 is mounted on the table 30, the notch 204 for positioning is in contact with the abutting pin 34, thereby positioning the tray 200 in a mounting direction.

A tray other than the tray 200 that supports the storage device 100 (specifically, the hard disk) can be detachably mounted on the table 30. Specifically, a tray that accords with the type of storage device is mounted on the table 30. Hereinafter, a configuration of a tray 210 that supports a storage device 110 will be described by referring to FIGS. 4A and 4B. Here, the storage device 110 is a solid state drive (SSD) smaller than the hard disk. In the present embodiment, the storage device 100 corresponds to a first storage device, and the storage device 110 corresponds to a second storage device. The storage device 110 differs from the storage device 100 in shape and size.

Figure 4A:
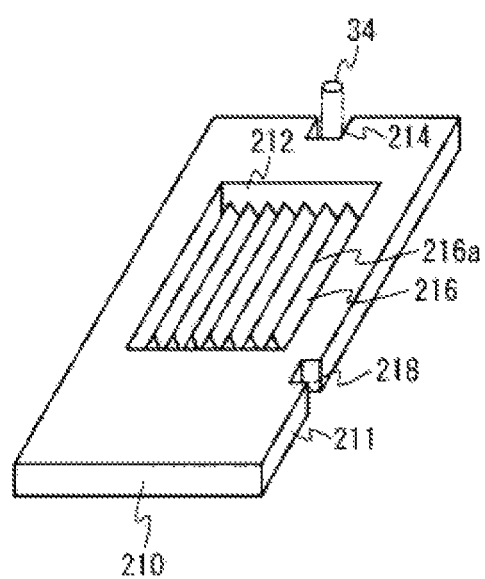
FIGS. 4A and 4B are each a schematic diagram illustrating a configuration of a tray 210.
Figure 4B:
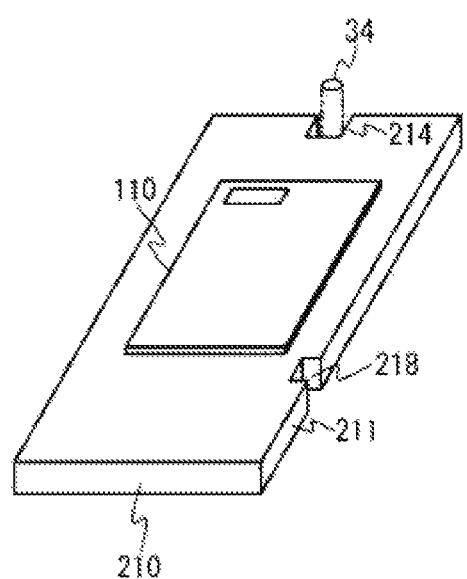

FIGS. 4A and 4B are each a schematic diagram illustrating the configuration of the tray 210. FIG. 4A shows the tray 210 and FIG. 4B shows the tray 210 on which the storage device 110 is placed. The tray 210 is formed in a rectangular flat plate shape, similar to the tray 200. The tray 210 includes a support recessed part 212, a notch 214 for positioning, a crushing part 216, and a notch part 218 for being detected. It should be noted that a side surface 211 of the tray 210 is the part to be detected of the support plate, which is detected by the tray detection part described below.

The support recessed part 212 is formed to have approximately the same size as an external shape of the storage device 110, and supports the storage device 110. The storage device 110 is fitted into the support recessed part 212 and set in the tray 210. A storage device 100 that is larger than the storage device 110 cannot be set in the support recessed part 212. It should be noted that, in the present embodiment, the support recessed part 202 corresponds to a first recessed part that supports the storage device 100, and the support recessed part 212 corresponds to a second recessed part that supports the storage device 110.

Here, the notch 214 for positioning is a part notched in one end side in the longitudinal direction of the tray 210. At the time of mounting of the tray 210, the notch 214 for positioning contacts the abutting pin 34, thereby positioning the tray 210 in the mounting direction.

The crushing part 216 is a part for physically destroying the storage device 110. The crushing part 216 here is convex parts 216a having sharp tips, and is provided on the bottom surface of the support recessed part 212. The convex parts 216a are successively provided along the longitudinal direction of the tray 210. A plurality of convex parts 216a are provided at predetermined intervals on the bottom surface of the support recessed part 212. The tips of the plurality of convex parts 216a are in contact with the storage device 110 placed on the tray 210.

The notch part 218 for being detected is a part to be detected for identifying the tray 210 mounted on the table 30. Unlike the tray 210, no notch to be detected is provided in the tray 200 described above (that is, the form of the side surface 201 of the tray 200 and the form of the side surface 211 of the tray 210 are different), therefore the tray 200 and the tray 210 can be identified by detecting the notch part 218 for being detected.

As described above, the trays 200 and 210 that accord with the types of the storage devices 100 and 110 are detachably mounted on the table 30. For example, when destroying the storage device 100, the operator attaches, to the table 30, the tray 200 on which the storage device 100 is set, and when destroying the storage device 110, he/she attaches, to the table 30, the tray 210 on which the storage device 110 is set.

The lifting mechanism 40 is a mechanism for lifting and lowering the table 30. The lifting mechanism 40, as shown in FIG. 2, has the hydraulic cylinder 42. The hydraulic cylinder 42 is configured to vertically move a piston in the cylinder with a hydraulic pump (not shown). The table 30 is lifted or lowered by the vertical movement of the piston. It should be noted that, in the above description, the hydraulic cylinder 42 is provided in order to lift or lower the table 30, but the embodiment is not limited to this, and other power sources may be provided.

The pusher plate 50 is a facing plate facing the table 30. Specifically, as shown in FIG. 2, the pusher plate 50 faces the table 30 with the storage device 100 therebetween. The pusher plate 50 is attached to the tool block 11 via guide shafts 55. The guide shafts 55 are provided such that they can move up and down in through-holes 11a of the tool block 11. The pusher plate 50 has a through-hole 51 through which the crushing tool 300 can be inserted.

The compression springs 60 are provided between the pusher plate 50 and the tool block 11 and are biasing members which bias the pusher plate 50. That is, the compression springs 60 bias the pusher plate 50 toward a descending direction. The upper ends of the compression springs 60 are respectively inserted into hole parts of the tool block 11.

Here, the tool mounting part 70 is provided in the tool block 11 and is a part where the crushing tool 300 is detachably mounted. Specifically, a crushing tool 300 for crushing the storage device 100 supported by the tray 200 is detachably mounted to the tool mounting part 70.

Figure 5A:
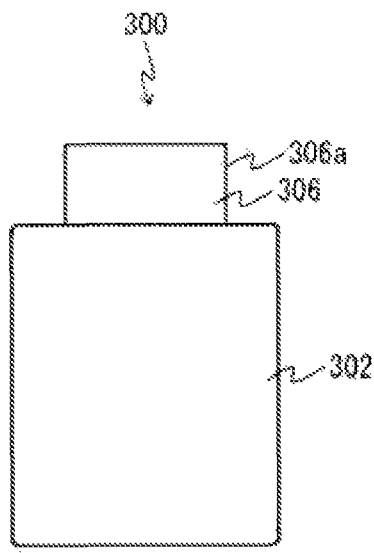
FIGS. 5A, 5B, and 5C are each a schematic diagram illustrating a configuration of a crushing tool 300.
Figure 5B:
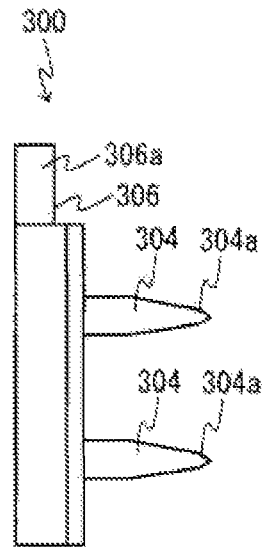
Figure 5C:
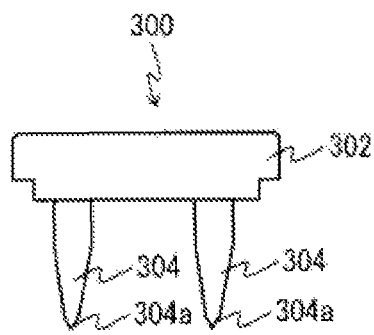

FIGS. 5A, 5B, and 5C are each a schematic diagram illustrating a configuration of the crushing tool 300. FIG. 5A shows a plane view of the crushing tool 300, FIG. 5B shows a right-side view of the crushing tool 300, and FIG. 5C shows a front view of the crushing tool 300. The crushing tool 300 has a base part 302, crushing parts 304, and an extension part 306.

The base part 302 is a part that serves as a base of the crushing tool 300. The base part 302 is formed in a cuboid shape. The base part 302 is engaged with the tool mounting part 70 when the crushing tool 300 is slid into and mounted to the tool mounting part 70.

The crushing parts 304 protrude downward from the base part 302 to form a cutting edge part. Specifically, the crushing parts 304 protrude from a lower surface of the base part 302. A plurality, here four, of the crushing parts 304 are provided at predetermined intervals on the lower surface of the base part 302. The crushing parts 304 each have a tapered tip end 304a. The tip ends 304a enter the inside of the storage device 100 and crush the storage device 100.

The extension part 306 is a part extending from one end surface in the longitudinal direction of the base part 302. The width of the extension part 306 is less than the width of the base part 302. A side surface 306a of the extension part 306 is a part to be detected of the crushing member, which is detected by the tool detection part described below.

In addition to the crushing tool 300 for crushing the storage device 100 (hard disk), a crushing tool 310 for crushing the storage device 110 (SSD) is detachably mounted to the tool mounting part 70. In the present embodiment, the crushing tool 300 corresponds to a first crushing member, and the crushing tool 310 corresponds to a second crushing member. The form of the crushing tool 310 is different from the form of the crushing tool 300.

Figure 6A:
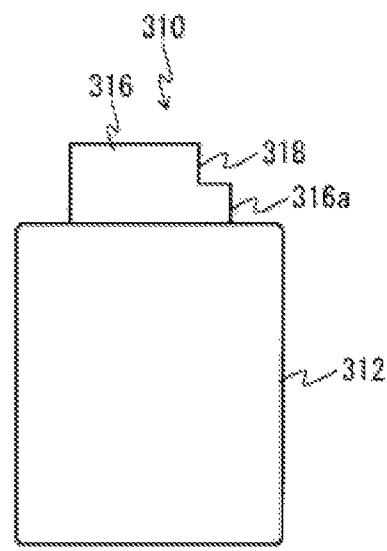
FIGS. 6A, 6B, and 6C are each a schematic diagram illustrating a configuration of a crushing tool 310.
Figure 6B:
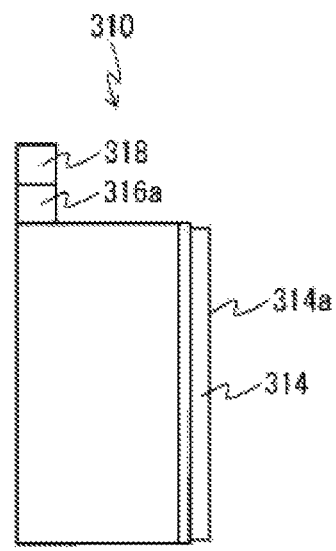
Figure 6C:
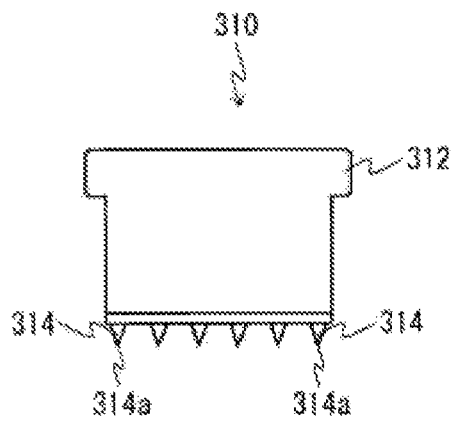

FIGS. 6A and 6B are each a schematic diagram illustrating a configuration of the crushing tool 310. FIG. 6A shows a plane view of the crushing tool 310, FIG. 6B shows a right side view of the crushing tool 310, and FIG. 6C shows a front view of the crushing tool 310. The crushing tool 310 has a base part 312, crushing parts 314, an extension part 316, and a notch part 318.

The base part 312 is a part that serves as a base of the crushing tool 310. The base part 312 is formed in a cuboid shape. The base part 312 is engaged with the tool mounting part 70 when the crushing tool 310 is mounted to the tool mounting part 70.

The crushing parts 314 protrude downward from the base part 312, and have a function of physically crushing the storage device 110. Here, the crushing parts 314 each have a convex part 314a with a sharp tip. The convex parts 314a are provided on a lower surface of the base part 312. The convex parts 314a are successively provided along the longitudinal direction of the crushing tool 310. A plurality of convex parts 314a are provided at predetermined intervals on the lower surface of the base part 312. By having such convex parts 314a, the chips inside the SSD, which is the storage device 110, can be broken more reliably.

An extension part 316 is a part extending from one end surface in the longitudinal direction of the base part 312. The width of the extension part 316 is less than the width of the base part 312. A side surface 316a of the extension part 316 is a part to be detected of the crushing member, which is detected by the tool detection part described below.

The notch part 318 is a part for identifying the crushing tool 310 mounted to the tool mounting part 70. Here, the notch part 318 is a part notched in the side surface 316a of the extension part 316. In the extension part 306 of the crushing tool 300 described above, no notch is provided (that is, the form of the extension part 316 and the form of the extension part 306 are different), therefore the crushing tool 300 and the crushing tool 310 can be identified by detecting the notch part 318.

As described above, the crushing tools 300 and 310 that accord with the types of the storage devices 100 and 110 are detachably mounted to the tool mounting part 70. For example, the operator mounts the crushing tool 300 to the tool mounting part 70 when destroying the storage device 100, and mounts the crushing tool 310 to the tool mounting part 70 when destroying the storage device 110.

A form of destruction of the storage device 100 set in the tray 200 by the crushing tool 300 will be described by referring to FIGS. 7A and 7B, and a form of destruction of the storage device 110 set in the tray 210 by the crushing tool 310 will be described by referring to FIGS. 8A and 8B.

Figure 7A:
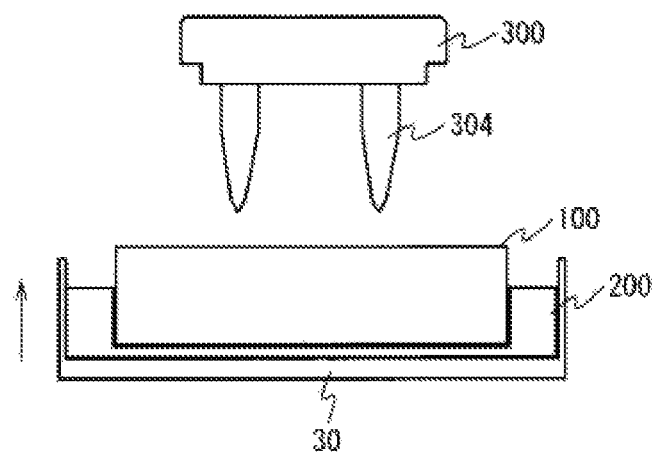
FIGS. 7A and 7B are each a schematic diagram illustrating a form of destruction of the storage device 100.
Figure 7B:
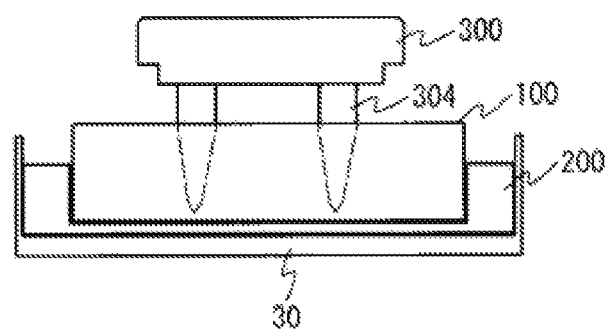

FIGS. 7A and 7B are each a schematic diagram illustrating the form of destruction of the storage device 100. FIG. 7A shows a state in which the table 30 is positioned in the standby position, and FIG. 7B shows a state in which the table 30 is positioned in the crushing position. Here, when the table 30 is positioned in the standby position, it is assumed that the tray 200 on which the storage device 100 is set is mounted on the table 30. The table 30 which is positioned in the standby position shown in FIG. 7A ascends to the crushing position. When the table 30 is ascending, it comes to a state where the pusher plate 50 (FIG. 2) sandwiches the storage device 100 with the tray 200. Thereafter, when the table 30 ascends further, as shown in FIG. 7B, the crushing parts 304 enter the inside of the storage device 100 and destroy the storage device 100. For example, the crushing parts 304 form holes in or deform a platter 102 (FIG. 3B) of the hard disk, which is the storage device 100.

Figure 8A:
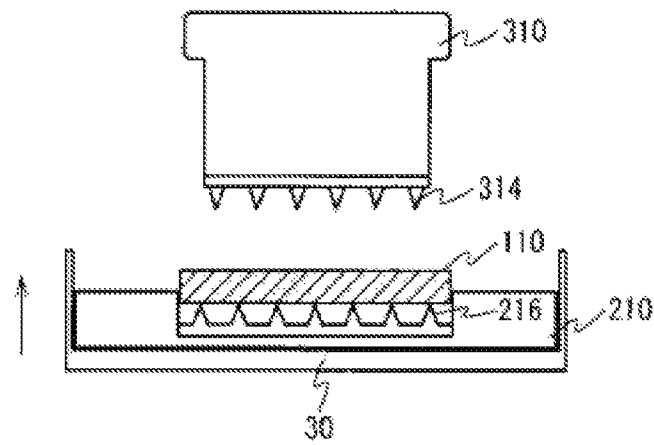
FIGS. 8A and 8B are each a schematic diagram illustrating a form of destruction of the storage device 110.
Figure 8B:
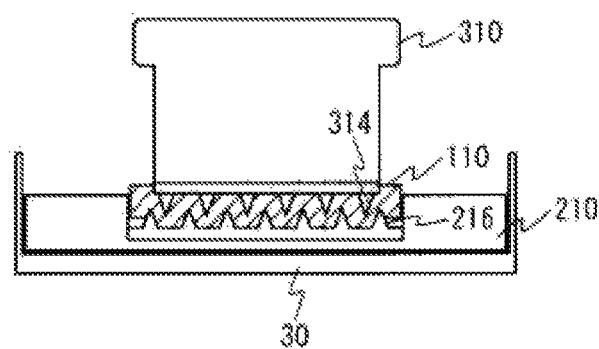

FIGS. 8A and 8B are each a schematic diagram illustrating the form of destruction of the storage device 110. FIG. 8A shows the state in which the table 30 is positioned in the standby position, and FIG. 8B shows the state in which the table 30 is positioned in the crushing position. Here, when the table 30 is positioned in the standby position, it is assumed that the tray 210 on which the storage device 110 is set is mounted on the table 30. The table 30 positioned in the standby position shown in FIG. 8A ascends to the crushing position. When the table 30 is ascending, it comes to a state where the pusher plate 50 (FIG. 2) sandwiches the storage device 110 with the tray 210 (specifically, the crushing part 216). Thereafter, when the table 30 further ascends, as shown in FIG. 8B, the crushing parts 314 and the crushing part 216 cooperate to deform and crush the storage device 110. For example, the crushing parts 314 and the crushing part 216 deform the SSD, which is the storage device 110, into a jagged shape, thereby breaking the chips inside the SSD. It should be noted that since the crushing parts 314 and the crushing part 216 are arranged to be skewed by a predetermined pitch, the storage device 110 is easily deformed into the shape shown in FIG. 8B.

The above-described destruction device 1 is carried by the operator. For example, the operator brings the destruction device 1 to a data center and the like where a server is installed, and destroys the storage devices 100 and 110 in the data center. It should be noted that, on the destruction device 1, handles 5 (FIGS. 1A and 1B) to be held by the operator when he/she carries the device are respectively provided on a left side and a right side of the device.

It is necessary to mount the tray 200 and the crushing tool 300 to destroy the storage device 100, and it is necessary to mount the tray 210 and the crushing tool 310 to destroy the storage device 110. However, there is a possibility that the operator may mount a tray and a crushing tool that are not suitable for the storage device to be destroyed. For example, when the storage device 100 is to be destroyed, there is a possibility that a combination of the tray 200 and the crushing tool 310 may be mounted by mistake. In particular, since the table 30 and the tool mounting part 70 are covered by the cover 20, it is difficult for the operator to visually confirm the tray and crushing tool being mounted. Therefore, if the tray 200 and the crushing tool 310 are mounted, there is a possibility that the tray 200 and the crushing tool 310, which are not the correct combination, may experience mechanical interference and become damaged when the table 30 ascends to the crushing position.

On the other hand, the destruction device 1 of the present embodiment has a configuration for identifying the mounted trays 200 and 210 and the mounted crushing tools 300 and 310, as will be described in detail below. Therefore, it is possible to prevent the trays 200 and 210 and the crushing tools 300 and 310 mounted in a wrong combination from experiencing interference and becoming damaged.

<Identification Configuration of the Trays and the Crushing Tools>

A configuration for identifying the mounted trays 200 and 210 and the crushing tools 300 and 310 will be described by referring to FIG. 9.

Figure 9:
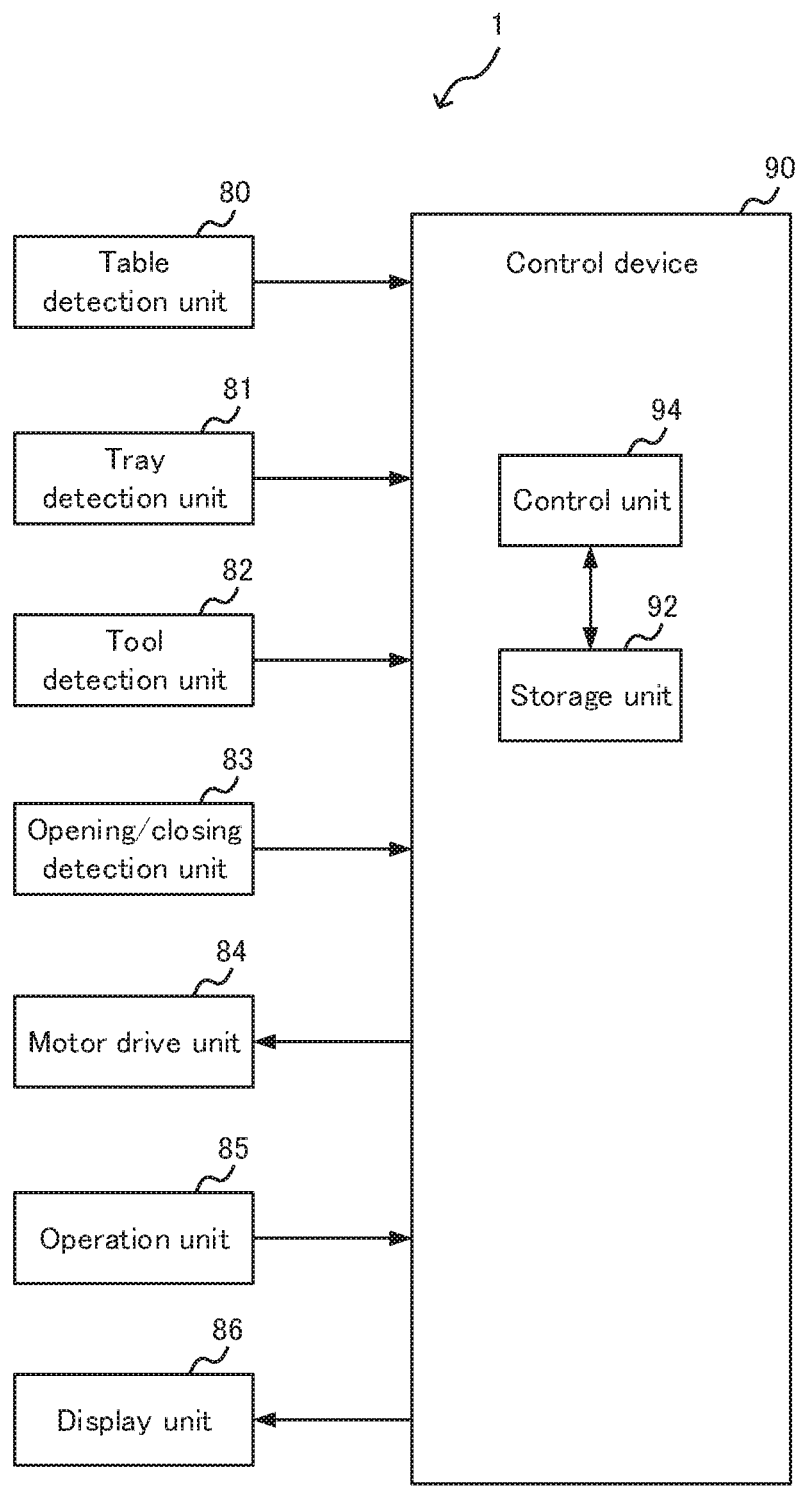
FIG. 9 is a block diagram illustrating a functional configuration of the destruction device 1.

FIG. 9 is a block diagram illustrating a functional configuration of the destruction device 1. The destruction device 1 includes, as shown in FIG. 9, a table detection unit 80, a tray detection unit 81, a tool detection unit 82, an opening/closing detection unit 83, a motor drive unit 84, an operation unit 85, a display unit 86, and a control device 90.

The table detection unit 80 detects a position of the table 30. That is, the table detection unit 80 detects the position of the table 30 when the table 30 is lifted and when the table 30 is lowered. For example, the table detection unit 80 detects the standby position and the crushing position of the table 30. The table detection unit 80 has a sensor that detects each of the standby position and the crushing position.

The tray detection unit 81 is a support plate detection part capable of detecting the tray 200 (or the tray 210) mounted on the table 30. The tray detection unit 81 detects the tray 200 supporting the storage device 100 and the tray 210 supporting the storage device 110.

The tray detection unit 81 detects the parts to be detected of the support plates provided on the trays 200 and 210. For example, the tray detection unit 81 detects a side surface 201 of the tray 200 when the tray 200 is mounted on the table 30, and detects a side surface 211 of the tray 210 when the tray 210 is mounted on the table 30. That is, the tray detection unit 81 detects the presence of the trays 200 and 210. The tray detection unit 81 detects the notch part 218 for being detected formed in the side surface 211 of the tray 210. On the other hand, since no notch part is provided in the side surface 201 of the tray 200, the tray detection unit 81 identifies and detects the trays 200 and 210. The tray detection unit 81 includes a first detection sensor, such as a reflective photo sensor, for example. The first detection sensor includes a presence/absence detection sensor that detects the presence of the trays 200 and 210, and an identification detection sensor that identifies and detects the trays 200 and 210.

The tool detection unit 82 is a crushing member detection part capable of detecting the crushing tool 300 (or crushing tool 310) mounted to the tool mounting part 70. The tool detection unit 82 detects the crushing tool 300 and the crushing tool 310.

The tool detection unit 82 detects the part to be detected of the crushing member, which is provided in the crushing tools 300 and 310. For example, the tool detection unit 82 detects the side surface 306a of the extension part 306 when the crushing tool 300 is mounted to the tool mounting part 70, and detects the side surface 316a of the extension part 316 when the crushing tool 310 is mounted to the tool mounting part 70. That is, the tool detection unit 82 detects the presence of the crushing tools 300 and 310. The tool detection unit 82 also detects the notch part 318 formed in the side surface 316a of the crushing tool 310. On the other hand, since no notch part is provided in the side surface 301 of the crushing tool 300, the tool detection unit 82 identifies and detects the crushing tools 300 and 310. The tool detection unit 82 includes a second detection sensor, such as a reflective photo sensor, for example. The second detection sensor includes a presence/absence detection sensor that detects the presence of the crushing tools 300 and 310, and an identification detection sensor that identifies and detects the crushing tools 300 and 310.

The opening/closing detection unit 83 detects an open or closed state of the opening/closing members 22 and 23 (FIGS. 1A and 1B) of the cover 20. For example, the opening/closing detection unit 83, detects the closed state of the opening/closing member 22 when the opening/closing member 22 is positioned in the closed position. Similarly, the opening/closing detection unit 83 detects the closed position of the opening/closing member 23 when the opening/closing member 23 is positioned in the closed position.

The motor drive unit 84 drives the hydraulic motor of the hydraulic pump of the lifting mechanism 40. When the motor drive unit 84 drives the hydraulic motor, the piston in the hydraulic cylinder 42 (FIG. 2) moves up and down. As a result, the table 30 is lifted and lowered.

The operation unit 85 receives various input operations relating to the destruction device 1. The operation unit 85 receives an operation for causing the destruction device 1 to execute a crushing process. For example, when the operator presses a start button provided on the operation unit 85, the operation unit 85 receives an execution of the crushing process. The operation unit 85 may be, for example, a touch panel displayed on the display unit 86.

The display unit 86 is, for example, a display provided on the upper surface of the cover 20, and displays information regarding status, operation, and the like of the destruction device 1. When the crushing process is completed, the display unit 86 displays a completion of the crushing process so that the operator can recognize the completion of the crushing process. Also, the display unit 86 displays an error when the trays 200 and 210 and the crushing tools 300 and 310 are not properly mounted. This enables the operator to easily grasp that the trays 200 and 210 and the crushing tools 300 and 310 are not mounted in the correct combination.

The control device 90 controls an overall operation of the destruction device 1. For example, control device 90 controls operations of the storage devices 100 and 110 during the crushing process. The control device 90 has a storage unit 92 and a control unit 94.

The storage unit 92 includes, for example, a ROM, a RAM, and the like, and stores various types of programs and various types of data for causing the control device 90 function. The storage unit 92 stores, for example, the number of crushes per storage devices 100 and 110. The storage unit 92 stores the number of uses of the trays 200 and 210 and the crushing tools 300 and 310. This enables to manage replacement timing for the trays 200 and 210 and the crushing tools 300 and 310.

The control unit 94 includes, for example, a CPU. The control unit 94 executes the various types of programs stored in the storage unit 92 to integrally control functions related to the control device 90. For example, the control unit 94 executes a crushing process described below.

The control unit 94 performs a determination process for determining whether the trays 200 and 210 detected by the tray detection unit 81 and the crushing tools 300 and 310 detected by the tool detection unit 82 correspond to the same type of storage devices 100 and 110. For example, the control unit 94 determines that the combination is correct and corresponds to the same type of storage devices 100 and 110 when the tray 200 and the crushing tool 300 are detected, or when the tray 210 and the crushing tool 310 are detected. On the other hand, the control unit 94 determines that the combination is incorrect when the tray 200 and the crushing tool 310 are detected, or when the tray 210 and the crushing tool 300 are detected.

When it is determined in the determination process that the trays 200 and 210 and the crushing tools 300 and 310 correspond to the same type of storage devices 100 and 110, the control unit 94 executes the crushing process to crush the storage devices 100 and 110. The control unit 94 executes the crushing process when the combinations of the trays 200 and 210 and the crushing tools 300 and 310 are correct (i.e., when it is determined that the tray 200 and the crushing tool 300 are mounted, or when it is determined that the tray 210 and the crushing tool 310 are mounted).

On the other hand, when it is determined in the determination process that the trays 200 and 210 and the crushing tools 300 and 310 do not correspond to the same type of storage devices 100 and 110 (i.e., the combinations of the trays 200 and 210 and the crushing tools 300 and 310 are not correct), the control unit 94 does not execute the crushing process of the storage devices 100 and 110. This prevents the trays 200 and 210 and the crushing tools 300 and 310 from interfering with each other and being damaged due to the use of incorrect combinations of the trays 200 and 210 and crushing tools 300 and 310. When the combination of the trays 200 and 210 and the crushing tools 300 and 310 is incorrect, the control unit 94 causes the display unit 86 to display an error indicating that the trays 200 and 210 and the crushing tools 300 and 310 are not mounted correctly.

The determination process of the trays 200 and 210 and the crushing tools 300 and 310 described above is performed when the operation unit 85 receives an execution operation. For example, when the operator presses the start button of the operation unit 85, the control unit 94 performs the determination process of the trays 200 and 210 and the crushing tools 300 and 310. Specifically, when the operator presses the start button of the operation unit 85 while the opening/closing member 22 and the opening/closing member 23 are positioned in the closed position, the control unit 94 performs the determination process of the trays 200 and 210 and the crushing tools 300 and 310.

However, the embodiment is not limited to the above, and for example, the control unit 94 may perform the determination process when the operator positions the opening/closing member 22 and the opening/closing member 23 in the closed position. As described above, since the determination process is performed when the opening/closing members 22 and 23 are positioned in the closed position, the operator is unable to visually check the tray and the crushing tool mounted prior to the crushing of the storage device, and thus he/she is unable to confirm whether the tray and the crushing tool are mounted in the correct combination. By performing the determination process and the crushing process described above, it is possible to prevent the storage device from being destroyed in a state in which the wrong tray and crushing tool are mounted.

VARIATION EXAMPLES

In the above description, the tray detection unit 81 identifies the tray 200 and the tray 210 by detecting the notch part 218 for being detected of the tray 210. Similarly, the tool detection unit 82 identifies the crushing tool 300 and the crushing tool 310 by detecting the notch part 318 of the crushing tool 310. However, identification methods for the trays 200 and 210 and the crushing tools 300 and 310 are not limited thereto, and the trays 200 and 210 and the crushing tools 300 and 310 may be identified, for example, by reading identification codes shown in FIGS. 10A, 10B, 11A and 11B.

Figure 10A:
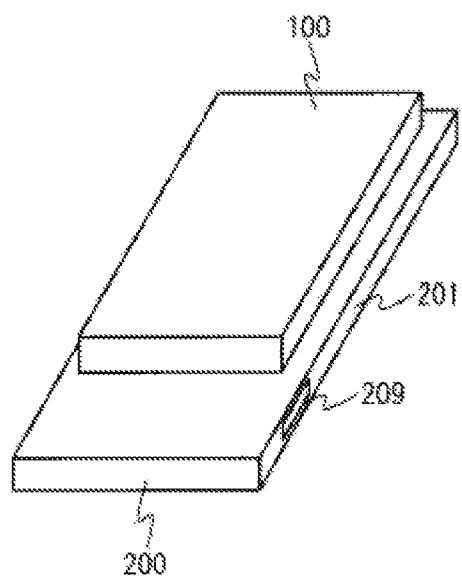
FIGS. 10A and 10B are each a schematic diagram illustrating a variation example of the tray 200 and the crushing tool 300.
Figure 10B:
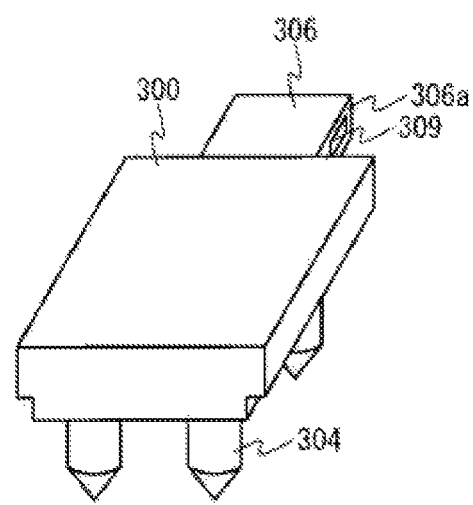

FIGS. 10A and 10B are each a schematic diagram illustrating a variation example of the tray 200 and the crushing tool 300. As shown in FIG. 10A, an identification code 209, which is an example of a support plate identification code, is attached to the tray 200. The identification code 209 is a barcode that stores information identifying the tray 200 and is attached to the side surface 201 of the tray 200. As shown in FIG. 10B, an identification code 309 which is an example of a crushing member identification code is attached to the crushing tool 300. The identification code 309 is a barcode that stores information identifying the crushing tool 300 and is attached to the side surface 306a of the extension part 306 of the crushing tool 300.

Figure 11A:
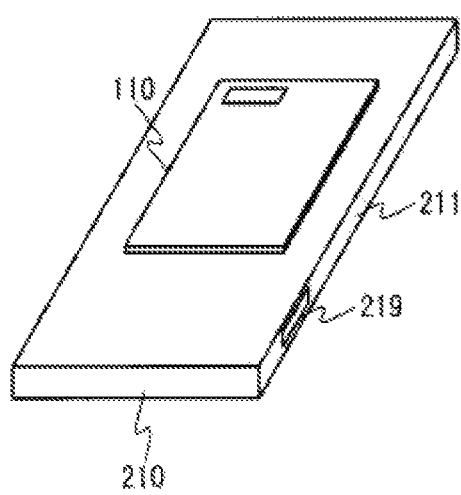
FIGS. 11A and 11B are each a schematic diagram illustrating a variation example of the tray 210 and the crushing tool 310.
Figure 11B:
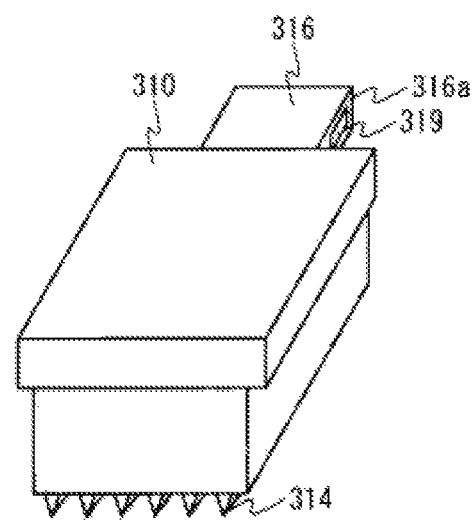

FIGS. 11A and 11B are each a schematic diagram illustrating a variation example of the tray 210 and the crushing tool 310. As shown in FIG. 11A, an identification code 219 is attached to the side surface of the tray 210. The identification code 219 is a barcode that stores information identifying the tray 210 and is different from the identification code 209 of the tray 200. No notch is provided in the side surface 211 since the identification code 219 is attached to the side surface 211. The side surface 306a of the extension part 306 of the crushing tool 310 is provided with an identification code 319, as shown in FIG. 11B. The identification code 319 is a barcode that stores information for identifying the crushing tool 310 and is different from the identification code 309 of the crushing tool 300. No notch is provided in the side surface 316a of the extension part 316 since the identification code 319 is attached to the side surface 316a.

The tray detection unit 81 includes a first reading unit that reads the identification codes 209 and 219 which differ according to the types of the trays 200 and 210. The first reading unit is, for example, a laser barcode reader. By reading the identification codes 209 and 219, the tray detection unit 81 can identify what types of the trays have been mounted.

The tool detection unit 82 includes a second reading unit that reads the identification codes 309 and 319 which differ according to the types of the crushing tools 300 and 310. The second reading unit is, for example, a laser barcode reader. By reading the identification codes 309 and 319, the tool detection unit 82 can identify what types of the crushing tools have been mounted.

It has been described above that the destruction device 1 destroys the storage device 100, which is the hard disk, and the storage device 110, which is the SSD, but the embodiment is not limited to this, and the destruction device 1 can destroy other types of storage devices, such as a storage device 120. The storage device 120 is, for example, a magnetic tape (so-called, a Linear Tape-Open (LTO)). In order to destroy the storage device 120, a tray 220, which is different from the trays 200 and 210, and a crushing tool 320, which is different from the crushing tools 300 and 310, are used.

Figure 12A:
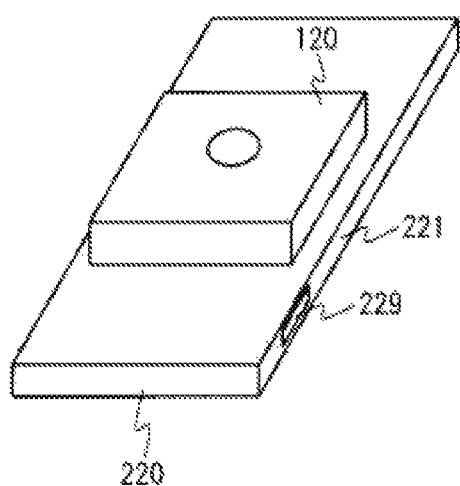
FIGS. 12A and 12B are each a schematic diagram illustrating a configuration of a tray 220 and a crushing tool 320.
Figure 12B:
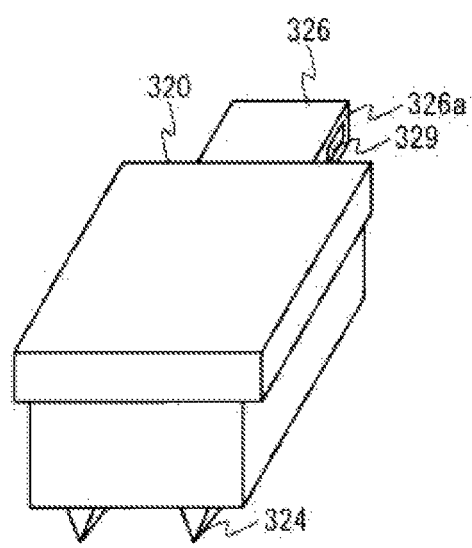

FIGS. 12A and 12B are each a schematic diagram illustrating a configuration of the tray 220 and the crushing tool 320. The storage device 120, which is the magnetic tape, is larger than the storage device 110, which is the SSD. The tray 220 supports the storage device 120, as shown in FIG. 12A. The tray 220 is similar in structure to the tray 210 shown in FIG. 11A, and an identification code 229 for identifying the tray 220 is attached to a side surface 221 of the tray 220. The crushing tool 320 has a structure shown in FIG. 12B, and is similar in structure to the crushing tool 310 shown in FIG. 11B. An identification code 329 is attached to the crushing tool 320. On the other hand, the shape and number of crushing parts 324 of the crushing tool 320 are different from the shape and number of the crushing parts 314 of the crushing tool 310.

The tray detection unit 81 can read the identification code 229 of the tray 220, and the tool detection unit 82 can read the identification code 329 of the crushing tool 320. Therefore, the trays 200, 210, and 220 and the crushing tools 300, 310, and 320 can be appropriately identified.

<Operation Example of the Crushing Device>

An exemplary operation of the destruction device 1 at the time of performing the crushing process will be described by referring to FIG. 13.

Figure 13:
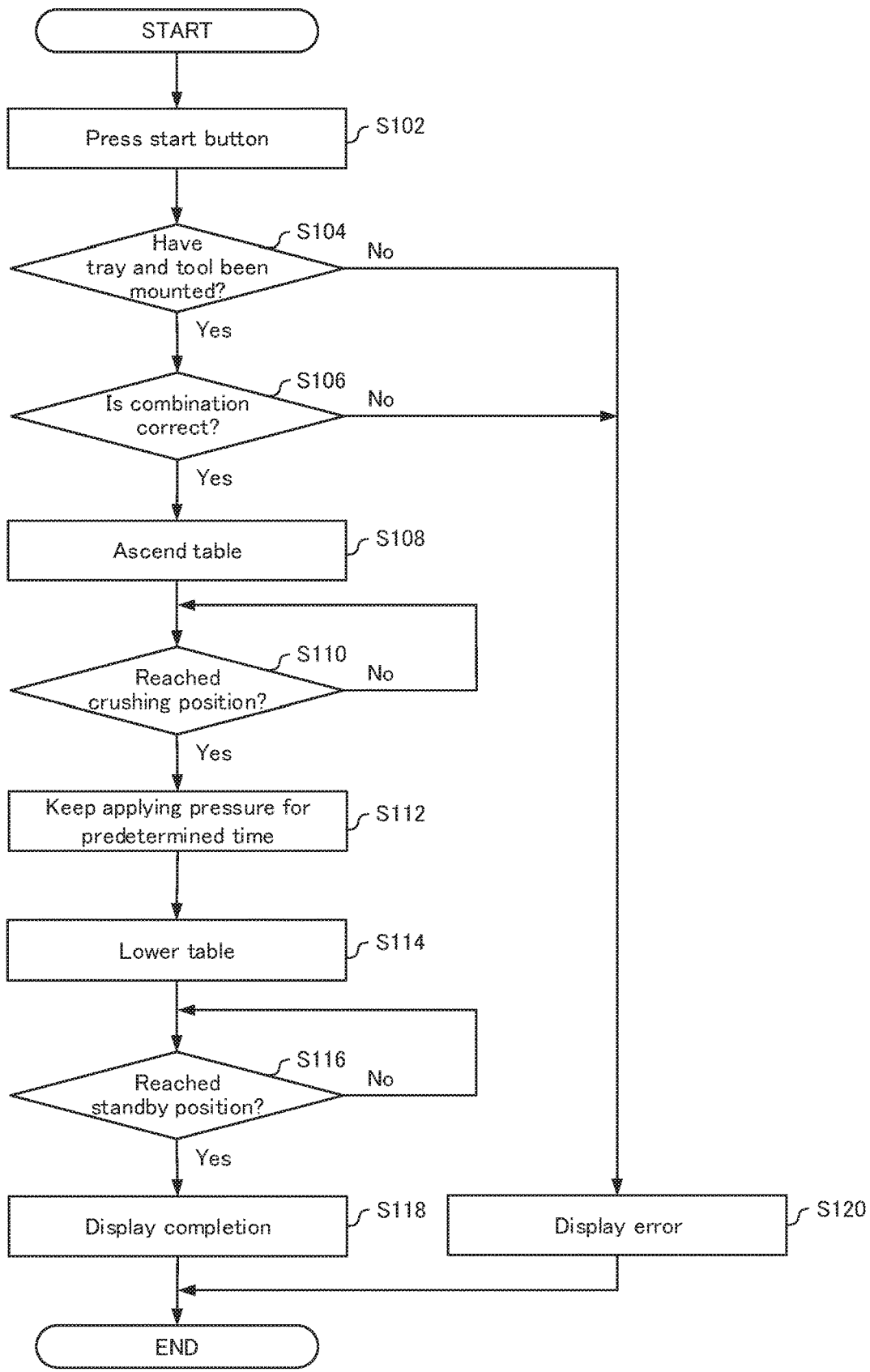
FIG. 13 is a flowchart illustrating a crushing process by the destruction device 1.

FIG. 13 is a flowchart illustrating the crushing process by the destruction device 1. Here, it is assumed that the operator mounts the tray 200 that supports the storage device 100 to the table 30, mounts the crushing tool 300 for crushing the storage device 100 to the tool mounting part 70, and positions the opening/closing members 22 and 23 in the closed position.

The flow starts when the operator presses the start button of the operation unit 85 (step S102). First, the control unit 94 determines whether a tray and a crushing tool have been mounted (step S104). Here, the tray detection unit 81 detects the tray 200, and the tool detection unit 82 detects the crushing tool 300. Therefore, the control unit 94 determines that the tray 200 and the crushing tool 300 have been mounted (step S104: Yes), and determines whether a combination of the mounted tray 200 and crushing tool 300 is correct or not (step S106).

Since the tray 200 and the crushing tool 300 are used for crushing the storage device 100, the control unit 94 determines that this combination is the correct combination (step S106: Yes). Then, the control unit 94 operates the motor drive unit 84 to ascend the table 30 positioned in the standby position to the crushing position (step S108). As a result, the storage device 100 supported by the tray 200 also ascends with the table 30.

Next, the control unit 94 determines whether or not the table 30 has reached the crushing position (step S110) with the table detection unit 80. In a case where it is determined that the table 30 has reached the crushing position (step S110: Yes), the control unit 94 operates the motor drive unit 84 to hold the table 30 in a pressed state for a predetermined time (step S112). In this case, the storage device 100 sandwiched between the pusher plate 50 and the tray is crushed by the crushing tool 300.

After the predetermined time has passed, the control unit 94 operates the motor drive unit 84 to lower the table 30 positioned in the crushing position (step S114). As a result, the crushed storage device 100 also descends with the table 30.

Next, the control unit 94 determines whether or not the table 30 has reached the standby position (step S116) with the table detection unit 80. In a case where it is determined that the table 30 has reached the standby position (step S116: YES), the control unit 94 causes the display unit 86 to display that the crushing of the storage device 100 is completed (step S118). This enables the operator to recognize that the crushing of the storage device 100 has been properly performed.

On the other hand, when it is determined that the tray or the crushing tool is not mounted (step S104: No), or when it is determined that the combination of the mounted tray and crushing tool is not correct (step S106: No), the control unit 94 does not perform the crushing of the storage device 100 and causes the display unit 86 to display an error (step S120). As a result, the operator recognizes that the tray and the crushing tool are not properly mounted and attempts to mount a tray and a crushing tool in the correct combination anew.

Effect of the Present Embodiment

The destruction device 1 of the embodiment described above detects the tray (here, the tray 200 that supports the storage device 100, and the tray 210 that supports the storage device 110) mounted on the table 30 and the crushing tool (here, the crushing tools 300 and 310) mounted to the tool mounting part 70. Then, the destruction device 1 performs the determination process for determining whether the combination of the mounted tray and crushing tool is correct or not, and performs the crushing process of the storage device when it is determined that the combination is correct.

That is, when it is determined that the tray 200 and the crushing tool 300 are mounted, the destruction device 1 crushes the storage device 100 supported by the tray 200, and when it is determined that the tray 210 and the crushing tool 310 are mounted, the destruction device 1 crushes the storage device 110 supported by the tray 210.

According to the above configuration, if the operator mounted the wrong combination of a tray and a crushing tool (for example, when the tray 200 and the crushing tool 310 are mounted), the crushing process is not performed. This prevents the tray and the crushing tool from interfering with each other and being damaged due to the crushing process performed with the tray and the crushing tool in the wrong combination. As a result, the plurality of types of storage devices 100 and 110 can be properly destroyed by one destruction device 1.

The present invention is explained on the basis of the exemplary embodiments. The technical scope of the present invention is not limited to the scope explained in the above embodiments and it is possible to make various changes and modifications within the scope of the invention. For example, all or part of the apparatus can be configured to be functionally or physically distributed and integrated in arbitrary units. Further, new exemplary embodiments generated by arbitrary combinations of them are included in the exemplary embodiments of the present invention. The effect of the new embodiment caused by the combination has the effect of the original embodiment together.

What is claimed is:

1. A destruction device configured to destroy a plurality of types of storage devices having different shapes and sizes, the destruction device comprising:
    a support plate mounting part to which a support plate that accords with a type of a storage device is detachably mounted;
    a crushing member mounting part to which a crushing member that (i) accords with the type of the storage device and (ii) sandwiches and crushes the storage device with the support plate is detachably mounted;
    a support plate detection part configured to detect the support plate mounted on the support plate mounting part;
    a crushing member detection part configured to detect the crushing member mounted on the crushing member mounting part; and
    a control unit that determines whether the support plate detected by the support plate detection part and the crushing member detected by the crushing member detection part correspond to a same type of storage device, and executes a crushing process for crushing the storage device upon determining that the support plate and the crushing member correspond to the same type of storage device.

2. The destruction device according to claim 1, wherein the support plate detection part includes
    a first detection sensor that detects a part to be detected of the support plate, which is provided on the support plate and differs in form according to the type of the storage device, and
    the crushing member detection part includes
    a second detection sensor that detects a part to be detected of the crushing member, which is provided on the crushing member and differs in form according to the type of the storage device.

3. The destruction device according to claim 2, wherein the first detection sensor detects a presence of a notch part provided in a side surface of the support plate, as the part to be detected of the support plate, and
    the second detection sensor detects a presence of a notch part provided in a side surface of the crushing member, as the part to be detected of the crushing member.

4. The destruction device according to claim 1, wherein the support plate detection part includes
    a first reading unit that reads a support plate identification code, which is attached to the support plate and differs according to the type of the storage device, and the crushing member detection part includes
    a second reading unit that reads a crushing member identification code, which is attached to the crushing member and differs according to the type of the crushing member.

5. The destruction device according to claim 4, wherein the first reading unit reads, as the support plate identification code, a barcode attached to the side surface of the support plate, and
    the second reading unit reads, as the crushing member identification code, a barcode attached to the side surface of the crushing member.

6. The destruction device according to claim 1, wherein the support plate with a support recessed part, which supports the storage device and differs in size according to the type of the storage device, is detachably mounted to the support plate mounting part.

7. The destruction device according to claim 1, wherein the crushing member with crushing part, which crushes the storage device and differs in size and shape according to the type of the storage device, is detachably mounted to the crushing member mounting part.

8. The destruction device according to claim 1, further comprising:
    a cover that covers the support plate mounting part and the crushing member mounting part;
    an openable first opening/closing member that closes a first opening for detaching and attaching the support plate to the support plate mounting part, the first opening being provided on the cover; and
    an openable second opening/closing member that closes a second opening for detaching and attaching the crushing member to the crushing member mounting part, the second opening being provided on the cover.

9. The destruction device according to claim 1, wherein a crushing part that crushes the storage device in cooperation with the crushing member is provided on a bottom surface of the support recessed part of a support plate that supports the storage device.

10. The destruction device according to claim 1, wherein the support plate detection part detects (i) a first support plate that has a first recessed part for supporting a first storage device and (ii) a second support plate that has a second recessed part for supporting a second storage device which differs from the first storage device in form and size,
    the crushing member detection part detects (i) a first crushing member that sandwiches and crushes the first storage device with the first support plate and (ii) a second crushing member that sandwiches and crushes the second storage device with the second support plate and differs from the first crushing member in form, and the control unit causes the crushing process to be executed (i) when the control unit determines that the first support plate and the first crushing member are mounted or (ii) when the control unit determines that the second support plate and the second crushing member are mounted.

* * * * *